United States Patent [19]

Kinard et al.

[11] Patent Number: 4,844,575
[45] Date of Patent: Jul. 4, 1989

[54] OPTICAL FIBER CABLE

[75] Inventors: Michael D. Kinard, Lawrenceville; Andrew J. Panuska, Buford; Mickey R. Reynolds, Lawrenceville; Manuel R. Santana, Doraville; George H. Webster, Dunwoody, all of Ga.

[73] Assignees: American Telephone and Telegraph Company, AT&T Bell Laboratories, Murray Hill; AT&T Technologies, Inc., Berkeley Heights, both of N.J.

[21] Appl. No.: 36,954

[22] Filed: Apr. 10, 1987

[51] Int. Cl.$^4$ .................. G02B 6/44; H02G 3/00; H02G 15/00

[52] U.S. Cl. .................. 350/96.23; 350/96.10; 174/70 R; 174/23 C; 174/106 D; 174/110 SR; 523/173

[58] Field of Search .............. 350/96.10, 96.23, 96.34; 174/23 R, 23 C, 70 R, 70 S, 106 D, 109, 110 SR; 523/173

[56] References Cited

U.S. PATENT DOCUMENTS

| | | | |
|---|---|---|---|
| 1,987,442 | 1/1935 | Harris | 174/27 |
| 4,037,922 | 7/1977 | Claypoole | 350/96.23 |
| 4,089,585 | 5/1978 | Slaughter et al. | 350/96.23 |
| 4,100,008 | 7/1978 | Claypoole | 350/96.23 |
| 4,148,560 | 4/1979 | Margolis | 350/96.23 |
| 4,185,887 | 1/1980 | Ferrentino | 350/96.23 |
| 4,195,906 | 4/1980 | Dean et al. | 350/96.23 |
| 4,199,225 | 4/1980 | Slaughter et al. | 350/96.23 |
| 4,420,220 | 12/1983 | Dean et al. | 350/96.23 |
| 4,446,686 | 5/1984 | Panuska et al. | 350/96.23 X |
| 4,464,013 | 8/1984 | Sabia | 350/96.23 |
| 4,610,505 | 9/1986 | Becker et al. | 350/96.23 |
| 4,645,298 | 2/1987 | Gartside | 350/96.23 |
| 4,701,016 | 10/1987 | Gartside et al. | 350/96.23 |
| 4,741,594 | 5/1988 | Suzuki | 350/96.23 |
| 4,765,712 | 8/1988 | Bohannon, Jr. et al. | 350/96.23 |
| 4,770,489 | 9/1988 | Saito et al. | 350/96.23 |

FOREIGN PATENT DOCUMENTS

| | | | |
|---|---|---|---|
| 0067009 | 5/1982 | European Pat. Off. | 523/173 X |
| 0074714 | 8/1982 | European Pat. Off. | 350/96.23 X |
| 0160778 | 11/1985 | European Pat. Off. | 350/96.23 |
| 2497964 | 7/1982 | France | 350/96.23 |
| 58-10703 | 1/1983 | Japan | 350/96.23 |
| 58-14804 | 1/1983 | Japan | 350/96.23 X |
| 58-27104 | 2/1983 | Japan | |
| 2106266 | 9/1982 | United Kingdom | 350/96.23 X |

OTHER PUBLICATIONS

R. A. Miller et al. "Tactical Low Loss Optical Fiber Cables for Army Applications", Proceedings of the 23rd Wire and Cable Symposium (Dec. 3-5, 1974), p. 266.
S. E. Miller et al., "Optical Fiber Telecommunications", p. 443 Brochure by Times Fiber Communications, Inc.
"Progress in Optical-fibre Communications", Wireless World, Aug. 1976.

Primary Examiner—William L. Sikes
Assistant Examiner—Brian M. Healy
Attorney, Agent, or Firm—Edward W. Somers

[57] ABSTRACT

An optical fiber cable (20) includes a core (21) comprising at least one optical fiber (24) which is enclosed in a tubular member (34) and which includes a sheath system (40). The sheath system includes two strength members 42—42 which extend linearly longitudinally along the cable parallel to a longitudinal axis (29) of the cable. The strength members are enclosed in a plastic jacket (46). The strength members have predetermined relative tensile and compressive stiffnesses. The stiffnesses are such that the strength members are capable of withstanding expected compressive as well as tensile loading and are coupled sufficiently to the jacket to provide a composite arrangement which is effective to inhibit contraction and which controls the position of the neutral axis during bending while providing suitable flexibility. The strength members in a preferred embodiment are made of a metallic material such as steel and have tensile and compressive stiffness which are substantially equal to cause the plane of bending to extend through the strength members. In other embodiments, the core is filled with a waterblocking material, the tubular member is enclosed by a water absorbent tape and/or a metallic shield and metallic conductors may extend colinearly with the strength members.

21 Claims, 5 Drawing Sheets

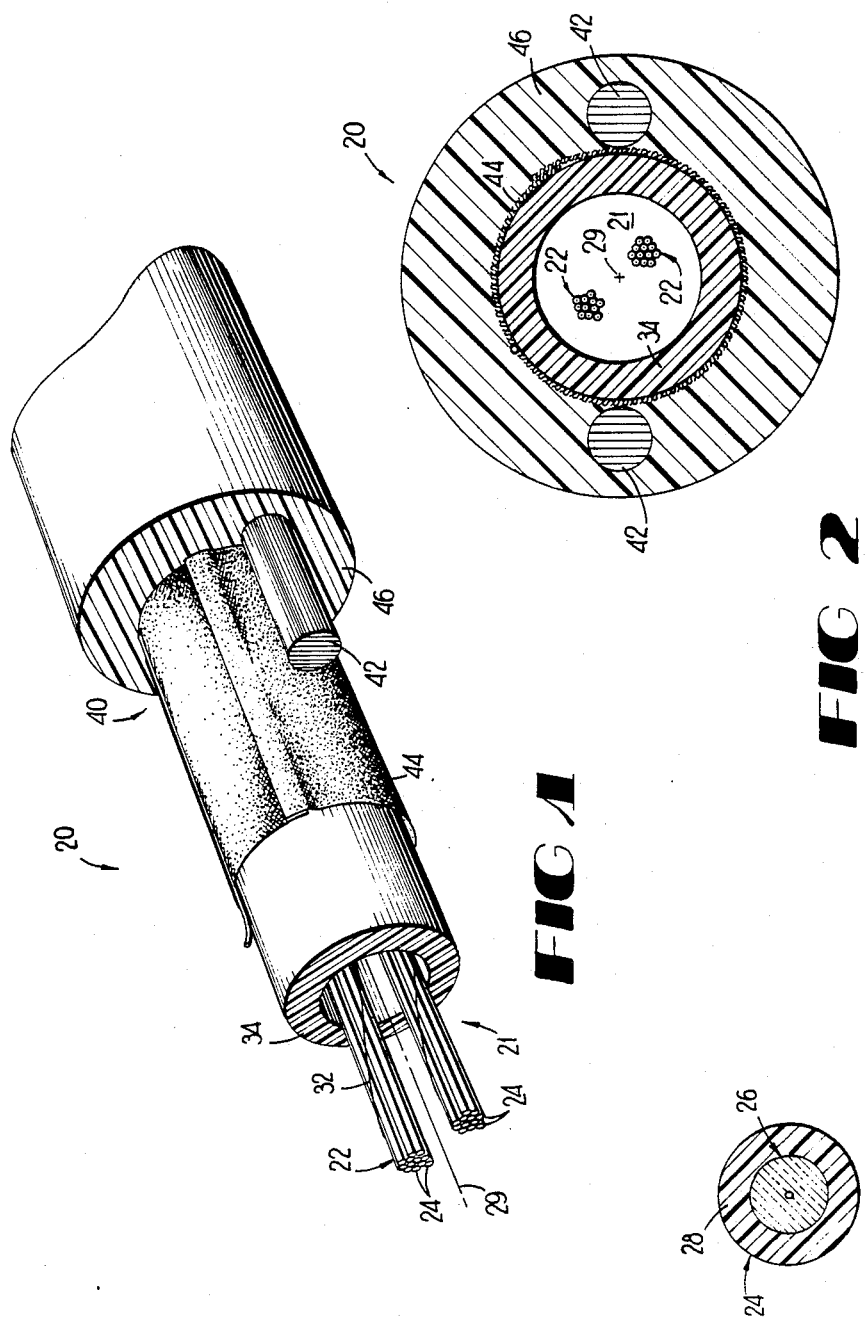

OPTICAL FIBER CABLE

TECHNICAL FIELD

This invention relates to an optical fiber cable. More particularly, it relates to an optical fiber cable in which two diametrically opposed linear members extending parallel to a longitudinal axis of the cable and being disposed adjacent to a core are capable of withstanding expected compressive as well as tensile forces.

BACKGROUND OF THE INVENTION

Optical fibers are in widespread use today as transmission media because of their large bandwidth capabilities and small size. Developments in the optical fiber communications field have been rapid. However, the technology still is undergoing major shifts in direction. An example of a shift which is driven by demand for higher bandwidths is that from multimode to single mode fibers.

Although desired for their large bandwidth capabilities and small size, light-transmitting optical fibers are mechanically fragile, exhibiting low-strain fracture under tensile loading and degraded light transmission when bent. The degradation in transmission which results from bending is known as microbending loss. As a result, cable structures have been developed to protect mechanically the optical fibers in various environments. For example, a cable for use in a duct must be capable of withstanding tensile loads applied when the cable is pulled into the duct and stresses caused by tortuous or arcuate paths.

Cable structures which have been developed for optical fibers include loose tube, stranded and ribbon cables. For a description of loose tube cables, see, for example, D. Lawrence and P. Bark "Recent Developments in Mini-Unit Cable" published at pp. 301–307 of the Proceedings of the 32nd International Wire and Cable Symposium, 1983. See also U.S. Pat. No. 4,153,332. In some situations, especially duct systems which include many bends such as those in loop plant in urban areas, relatively high tensile loads are expected.

In one type of optical communications cable, a plurality of optical fibers is enclosed in an extruded plastic tube to form a unit and a plurality of these tubed units is enclosed in a common extruded plastic tube which is enclosed in a sheath system. Each unit is made on a manufacturing line and inventoried until it is stranded with other units on another line whereat a plastic jacket also is applied.

What still was sought was a cable for optical fiber transmission which departed from the stranding of units and which inhibited the introduction of undue stresses that could lead to microbending losses in the optical fibers. A cable which satisfies these needs is disclosed in App. Ser. No. 721,533 which was filed on Apr. 10, 1985, now pending, in the names of C. H. Gartside, III, A. J. Panuska, and P. D. Patel. That cable includes a plurality of optical fibers which are assembled together in a core without intended stranding to form units which extend in a direction along a longitudinal axis of the cable. A length of tubing which is made of a plastic material encloses the plurality of units and is parallel to the longitudinal axis of the cable. The ratio of the cross-sectional area of the plurality of optical fibers to the cross-sectional area within the tubing does not exceed a predetermined value.

A sheath system for the just-described cable may be one disclosed in U.S. Pat. No. 4,241,979 which issued on Dec. 30, 1980 in the names of P. F. Gagen and M. R. Santana. A bedding layer, about which strength members are wrapped helically, is added between plastic extruded inner and outer jackets to control the extent to which the strength members are encapsulated by the outer jacket. The cable includes two separate layers of metallic strength members, which are wrapped helically in opposite directions. Under a sustained tensile load, these two layers of strength members produce equal but oppositely directed torques about the cable to insure the absence of twisting. Advantageously, the strength members not only provide the necessary strength characteristics for the cable, but also reinforce the sheath and help protect the optical fiber from external influences.

Such a sheath system as described may be replaced with one in which only one layer of metallic strength members is used. See Appl. Ser. No. 825,291 filed on Jan. 31, 1986 in the names of W. D Bohannon, Jr., et al, now U.S. Pat. No. 4,765,712. A core is enclosed by a tube which is made of a plastic material, a shield system and an outer plastic jacket. The shield system provides rodent and/or lightning protection. Strength is provided by a plurality of helically wrapped members which are disposed in a single layer concentric with the core and which in a preferred embodiment are adjacent to an outer surface of the shield with substantial portions of their peripheries embedded in the plastic of the outer jacket.

In some prior art cables, the metallic wires of the sheath system in hereinbefore-identified U.S. Pat. No. 4,241,979 have been replaced with glass fiber members at least some of which are capable of withstanding expected compressive as well as tensile loading. Compressive loading occurs when the cable tends to contract during initial shrinkage of the jacket material, during bending, and during thermal cycling. Interposed between a tubular member which encloses a core and a plastic jacket is a layer of strength members which are wrapped helically about the core. A first plurality of the strength members are relatively flexible and a second plurality of the strength members have sufficient compressive stiffness and are coupled sufficiently to the jacket to provide a composite arrangement which is effective to inhibit contraction of the cable.

Although the sheath systems of U.S. Pat. No. 4,241,979 and in Appl. Ser. No. 825,291 meet the aforementioned needs, efforts have continued to find alternatives. The number of strength members in prior art cables is usually high, and core entry necessitates the violation of the integrity of these strength members. Further, these strength members generally are wound helically about the core which process involves the rotation of relatively heavy supplies.

What is still needed and what seemingly is not provided by the prior art is a cable having a compact and relatively uncomplicated sheath system which is capable of withstanding compressive as well as tensile loading. The sought-after cable should be adaptable to a variety of environments and accommodate a plurality of optical fibers. Also, the sought-after cable should be one which may be made without involving the rotation of relatively heavy supplies and one in which the core may be accessed without violating the integrity of the strength member system.

SUMMARY OF THE INVENTION

The foregoing problems of the prior art have been overcome by an optical fiber cable of this invention. The optical fiber cable includes a core which comprises at least one optical fiber and a tubular member which may be made of a dielectric material and which encloses the core. A jacket which is made of a plastic material encloses this tubular member. The cable also includes a strength member system which includes two diametrically opposed, linear extending strength members which are disposed adjacent to the tubular member, and which extend parallel to a longitudinal axis of the core. The strength members have sufficient tensile and compressive stiffnesses and are coupled sufficiently to the jacket to provide a composite structure which is effective to inhibit contraction of the cable and to provide the cable with suitable strength properties. The relative tensile and compressive stiffnesses are predetermined to control the behavior of the cable when subjected to bending and to control the location of the neutral axis in bending.

Prior art cables have included a substantial number of glass rod-like strength members each of which may be quite large in cross sectional area. Advantageously, the cable of the preferred embodiment of this invention provides necessary strength requirements with two strength members which preferably are made of steel and which are relatively small.

BRIEF DESCRIPTION OF THE DRAWINGS

Other features of the present invention will be more readily understood from the following detailed description of specific embodiments thereof when read in conjunction with the accompanying drawings, in which:

FIG. 1 is a perspective view of an optical fiber cable of this invention;

FIG. 2 is an end view of the cable of FIG. 1;

FIG. 3 is an end view in section of an optical fiber;

DETAILED DESCRIPTION

Figures 4, 5:
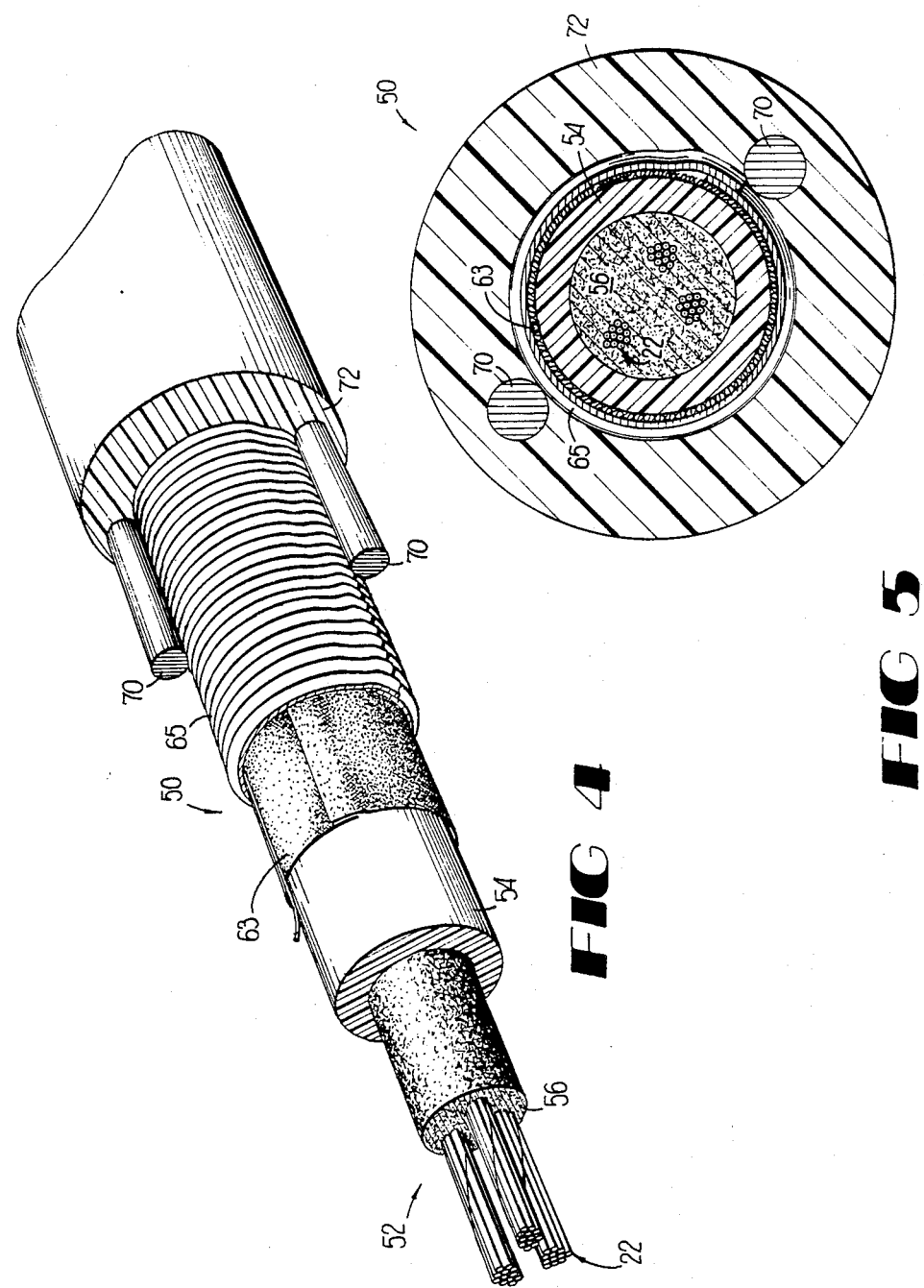
FIG. 4 is a perspective view of a preferred embodiment cable of this invention which includes a core that is filled with a waterblocking material.
FIG. 5 is an end view of the cable of FIG. 4.

Referring now to FIGS. 1 and 2, there is shown an optical fiber cable 20 of this invention. The optical fiber cable includes a core 21 which comprises one or more optical fibers 24—24. Each optical fiber includes a core and a cladding. The optical fibers 24—24 may be made by the modified chemical vapor deposition process, for example, as disclosed in U.S. Pat. No. 4,217,027 which issued on Aug. 12, 1980 in the names of J. B. MacChesney and P. O'Connor. Further, each of the optical fibers 24—24 includes an optically suitable core and cladding 26 and one or more coatings 28—28 (see FIG. 3). It should be understood that herein the term optical fiber refers to the fiber itself and any coating applied thereto.

The core 21 comprises a plurality of units each of which is designated generally by the numeral 22 and each of which includes a plurality of the individual optical fibers 24—24. Each of the units 22—22 either is stranded or non-stranded, that is, the unit extends generally parallel to a longitudinal axis 29 of the cable, or is formed with an oscillating lay.

It should be understood that the optical fibers 24—24 which are included in each of the units 22—22 of the preferred embodiment are assembled without being stranded together and furthermore that the unit itself is assembled with an infinite lay length. The optical fibers may be undulated along portions of the unit which will cause each of the optical fibers to have a length which is at least slightly greater than the length of any enclosing sheath system. This will prevent undue stain from being imparted to the optical fibers 24—24 during manufacture, installation, and service of the cable.

As is further seen in FIGS. 1 and 2, the core 21 comprises a plurality of units which are individually bound by a binder 32 and which are enclosed in a tubular member 34. The tubular member 34 in a preferred embodiment which is made of a dielectric material such as polyvinyl chloride or polyethylene, for example, contains the individually untubed, bound units and extends generally parallel to the axis 29.

An important characteristic of the cable of this invention is its packing density. Packing density is defined as the ratio between the cross sectional area of the optical fibers including any coatings thereon to the total cross sectional area enclosed by the tube 34. If the packing density is too high, optical fibers within the core may experience relatively high stress and could break during handling of the cable. This occurs when the packing density is too high because as with the use of waterblocking materials which yield at a relatively high stress, the optical fiber cannot move sufficiently within the tube to relieve stresses such as would occur in bending. In the prior art, this problem was overcome by stranding the individual tubes which enclose the units. However, as is well-known, stranding requires a lower line speed and results in increased costs. The maximum packing density preferably is about 0.5.

Enclosing the core 21 and the tubular member 34 is a sheath system which is designated generally by the numeral 40. The sheath system 40 includes a strength member system comprising strength members 42—42, a tape 44 and an outer plastic jacket 46. In a preferred embodiment of FIG. 1, the tape 44 is a water absorbing tape such as Waterlock ™ Laminate available from the Grain Processing Corporation and is wrapped about the tube 34 with a longitudinal overlapped seam. In the cable of FIG. 1, the tape 44 which prevents the adhesion of the jacket 46 to the tube 34 could also be made of a non-woven polyester material. The plastic jacket 46 generally is made of a polyethylene material. A rip cord 45 which may be made of Kevlar® plastic is used to facilitate sheath removal.

In the embodiment shown in FIG. 1, the tubular member 34 has inner and outer diameters of about 0.170 and 0.240 inch, respectively. The water absorbing tape has a thickness of about 0.015 inch and the jacket has inner and outer diameters of about 0.250 and 0.450 inch, respectively.

In a preferred embodiment, the strength member system includes two strength members 42—42 which are located adjacent to the tubular member 34 and which are enclosed substantially by the jacket 46. Further, in the preferred embodiment, the strength members 42—42 are in engagement with the tape 44. Each of the strength members 42—42 comprises a metallic material such as steel, for example. Further, the two strength members are diametrically opposed and are linearly extending in the same direction with the longitudinal axis 29. By linearly extending in the same direction is meant that each strength member is linear and extends substantially parallel to the longitudinal axis 29, thereby avoiding the disadvantages of a system in which the strength members are wrapped helically about the core, for example.

The strength members must meet several criteria. First, the strength members must have sufficient compressive stiffness and be coupled sufficiently to the jacket to provide a composite structure which is effective to inhibit axial contraction of the cable. This prevents undue microbending losses from shrinkage during production as the cable jacket cools and during low temperature swings. Further, each strength member must have sufficient tensile and compressive stiffness to control strains induced during bending, tension and installation loads in general, such as pulling into a duct without causing the cross sectional shape of the cable to be overly large. Further, the cable must be relatively flexible.

Also, the strength members 42—42 of the cable of this invention must be characterized by a compressive stiffness which is sufficient to cause the cable to bend in a predetermined manner. The cable 20 when subjected to bending forces, is caused to twist and reorient itself so that the cable bends about a neutral axis which extends through the two strength members and, thus, through the geometric center of the cable. This reorientation is directly attributable to the compressive stiffness of the strength members. If such reorientation does not occur, and the strength members have a much lower compressive stiffness than tensile stiffness, the neutral axis of bending may be displaced from the geometrical axis. As a result, some of the optical fibers may be put in compression and have undesired microbending losses.

More specifically, during pure cable bending, there is a curved plane of zero stress and strain along the length of the cable. In a cross-sectional view of the cable, this plane is viewed on edge and appears as a line, which is called the neutral axis, through the cross-section. For axisymmetric cable designs, such as those having a central strength member or a plurality of helically wound strength elements in the sheath system, there is no preferred orientation of the neutral axis during bending, that is, no more or less energy is required to bend the cable in any direction. A non-axisymmetric structure, such as one with two diametrically opposed and linearly extending strength members, has a preferred orientation of the neutral axis which is orthogonal to and which defines a preferred plane of bending within which the energy required to bend the cable is minimized.

For a cable structure with two diametrically opposed linearly extending strength members, the preferred orientation for minimizing the energy needed to bend the cable is one in which the neutral axis passes centrally through the two members. The preferred plane of bending is normal to the neutral axis of bending at each point along the longitudinal axis of the cable in the curved plane of zero stress and strain. If the cable is restrained during bending such that the neutral axis does not have the preferred orientation, greater energy is required to bend the cable and the cable assumes a neutral equilibrium position as long as the restraining forces remain. If the restraining forces are removed, the bent cable assumes a state of unstable equilibrium and reorients itself to a stable position by twisting axially to cause the neutral axis to be moved to the preferred orientation.

It is well known that cables commonly are bent in a manner which is not unrestrained and which often involves significant frictional loads caused by bending around sheaves, bell-mouths, and arcuate paths encountered in duct runs. Both end restraints on either side of the bend and surface friction may offer restraining forces which resist twisting of the cable to reorient itself to the preferred plane of bending.

Cables of the prior art include two diametrically oppossed and linearly extending strength members having relatively high tensile stiffness but having low or no compressive stiffness, including yarns or ropes or other stranded members. When such a cable as bent has a plane of bending other than the preferred one, greater energy is required to elongate the single strength member in the tensile side of the bending plane but no significant additional amount of energy is required to compress the opposing member. The restraining force necessary to maintain a state of neutral stability while bending the cable in the non-preferred plane is proportional to the total amount of additional energy required to elongate the single member in tension. If the restraining force is of sufficient magnitude to prevent twisting, the prior art cable will remain bent in the non-preferred plane and the neutral axis will be caused to seek a position of minimum energy and be moved away from the center of the cable. As a result, the core of the prior art cable will experience greater average compressive strain than in the case of an axisymmetric cable, to the detriment of the optical performance of the optical fibers.

What has been needed and what has not been available in the prior art is a cable structure having linear strength members characterized either by an enhanced tendency to overcome such restraining forces or by the ability to maintain the central orientation of the neutral axis in the event of a restrained position which cannot be overcome.

Both of these characteristics are provided by the cable of this invention by requiring the strength members to have predetermined relative tensile and compressive stiffnesses. The closer the compressive stiffness of each strength member to its tensile stiffness, the greater the twisting forces which are generated to overcome restraining forces. Also, the closer the neutral axis will be to remaining in the center of the cable cross-section. Upon the bending of this cable in a non-preferred plane, greater energy is required than for bending in the preferred plane both to elongate the tensed member and to shorten the opposing compressed member. The total energy required is about twice that of a prior art cable having members with the same tensile stiffness as this invention but with little compressive stiffness. Therefore, the restraining force must be of an equally greater magnitude to maintain the cable of this invention in a state of neutral equilibrium. Conversely, if the amount of restraining force is limited, as is often the case with frictional forces, there is a greater probability that the cable of this invention will overcome those forces and reorient itself in the preferred plane, thus reducing the installation forces necessary to accomplish the bent configuration.

In the case where restraining forces may not be overcome, the cable of this invention will balance substantially the tensile and compressive strains and therefore the neutral axis will continue to pass through the center of the cable core. Thus the optical fibers 24—24 in the core 21 will experience zero average strain, avoiding any threat to optical performance because of microbending.

The cable of this invention therefore has substantially enhanced ability to overcome any restraining forces when bent in the non-preferred plane by twisting and reorienting itself for a minimum input of energy to develop the bend than those in which the strength members have a relatively low compressive modulus. It also will continue to maintain an advantageous strain environment for the core and fibers therein notwithstanding restraining forces large enough to preclude twist and reorientation.

Advantageously, the cable of this design therefore will provide substantially the same protection for the fibers in the core 21 as a cable of axisymmetric construction. These benefits which have been described in the context of pure bending also extend to normal installation loading for cables which includes not only bending of the cables, but also pulling.

In order to provide these properties, each of the strength members 42—42 preferably is made of steel, such as for example, grade ASTM-A228-77. Further, each of the strength members 42—42 in a preferred embodiment of the cable of FIGS. 1 and 2 is single strand and has an outer diameter of about 0.064 inch. The strength members exhibit suitable compressive and tensile modulii each of which is about 30,000,000 psi.

Going now to FIGS. 4 and 5, there is shown a preferred embodiment of the cable of this invention. The cable which is designated generally by the numeral 50 includes a core 52 which is similar to the core 21 of the cable 20 and which is enclosed in a tubular member 54.

In the embodiment shown in FIGS. 4 and 5, the units 22—22 and the core 52 between the units and the tubular member 54 are filled with a suitable waterblocking material 56. It has been determined that in an optical fiber cable, a filling composition must also function to maintain the optical fibers in a relatively low state of stress. Such a material is a colloidal particle-filled grease composition disclosed in Appl. Ser. No. 697,054 which was filed Jan. 31, 1985, in the names of C. H. Gartside, and now U.S. Pat. No. 4,701,016 et al. and which is incorporated by reference hereinto.

A grease typically is a solid or semiliquid substance comprising a thickening or gelling agent in a liquid carrier. The gelling agents used in greases frequently are fatty acid soaps, but high melting point materials, such as clays, silicas, organic dyes, aromatic amides, and urea derivatives also may be used.

When a low stress is applied to a grease, the material acts substantially as a solid-like material. If the stress is above a critical value, then the viscosity decreases rapidly and the material flows. The decrease in viscosity is largely reversible because typically it is caused by the rupture of network junctions between filler particles, and these junctions can reform following the removal of the supercritical stress.

A cable filling or waterproofing material, especially an optical fiber cable filling compound, should meet a variety of requirements. Among them is the requirement that the physical properties of the cable remain within acceptable limits over a rather wide temperature range, e.g. from about −40° to about 160° F. It is also desirable that the filling material be relatively free of syneresis over the aforementioned temperature range. Syneresis is the separation of oil from the gel under applied stress. Filling materials for use in optical fiber cables also should have a relatively low shear modulus. According to the prior art, the shear modulus is a critical material parameter of optical fiber cable filling materials because it is believed to be directly related to the amount of microbending loss. For a discussion of microbending loss, see S. E. Miller et, al., *Optical Fiber Telecommunications*, Academic Press, New York (1979), pp. 158–161.

The preferred waterblocking material is a composition which comprises two major constituents, namely oil, and a gelling agent such as colloidal particles, and, optionally, a bleed inhibitor. The waterblocking composition also may include a thermal oxidative stabilizer.

Among the oils useful in the waterblocking material are polybutene oils having a minimum specific gravity of about 0.83 and a maximum pour point, as per ASTM D97, of less than about 18° C., or ASTM type 103, 104A, or 104B, or mixtures thereof, per ASTM D-226 test, of naphthenic or paraffinic oils having a minimum specific gravity of about 0.86, and a maximum pour point, per ASTM D97, of less than about −4° C. Specific examples of oils useful in the cable of the invention are a polybutene oil, which is a synthetic hydrocarbon oil having a pour point per ASTM D97 of −35° C., and SUS viscosity of 1005 at 99° C., a specific gravity of 0.8509, and an average molecular weight of 460. It is available from the Amoco Chemical Corporation, Texas City, Tex., under the trade designation L-100. Another example oil is a white mineral oil, having a pour point per ASTM D97 of −25° C., an SUS viscosity of 53.7 at 99° C., an average specific gravity of 0.884, and maximum aromatic oils 1% by weight (b.w.). The latter is available from Penreco of Butler, Pa., under the designation Drakeol 35. Other oils include triglyceride-based vegetable oils such as castor oil and other synthetic hydrocarbon oils such as polypropylene oils. For applications requiring fire-retardant properties, chlorinated paraffin oils having a chlorine content of about 30 –75% b.w. and a viscosity at 25° C. of between 100 and 10,000 cps are useful. An example of such oil is Paroil 152, which is available from the Dover Chemical Company of Dover, Ohio. Polymerized esters of acrylic acid or similar materials are useful as pour-point depressants at addition levels below 5% b.w. An example is ECA 7955, available from the Exxon Chemical Company.

Colloidal filler particles in oil gel the oil by bonding surface hydroxyl groups to form a network. Such gels are capable of supporting a load below a critical value of stress. Above this stress level, the network is disrupted, and the material assumes a liquid-like character and flows under stress. Such behavior is often referred to as thixotropic.

Colloidal fillers useful in the cable of the invention include colloidal silica, either hydrophilic or hydrophobic, preferably a hydrophobic fumed silica having a BET surface area between about 50 and about 400 m²/gm. An example of a hydrophobic fumed silica is a polydimethylsiloxane-coated fumed silica having a BET surface area of about 80–120 m²/gm, containing about 5% b.w. carbon, and being available from the Cabot Corporation of Tuscola, Ill. under the trade designation Cab-O-Sil N70-TS. An exemplary hydrophilic colloidal material is fumed silica with a BET surface area of about 175–225 m²/gm, nominal particle size of 0.012 μm, and a specific gravity of 2.2, available from the Cabot Corporation under the designation Cab-O-Sil M-5. Other colloidal fillers useful in the practice of the invention are precipitated silicas and clays such as bentonites, with or without surface treatment.

Oil-retention of the inventive greases may be improved by the addition of one or more bleed inhibitors to the composition. The bleed inhibitor can be a rubber block copolymer, a relatively high viscosity semiliquid, sometimes referred to as semisolid rubber, or other appropriate rubber. Block copolymers and semiliquid rubbers will be referred to collectively as rubber polymers. Incorporating a rubber polymer into the grease composition allows a reduction in the amount of colloidal particles that must be added to the mixture to prevent syneresis of the gel. This reduction can result in cost savings. Furthermore, it makes possible the formulation of nonbleeding compositions having a relatively low critical yield stress.

Among the rubber block copolymers that can be used in waterblocking compositions for the cable of the invention are styrene-rubber and styrene-rubber-styrene block copolymers in which the rubber may be a polybutadiene, polyisoprene, polyethylene-butylene copolymer or polyethylene-propylene copolymer and which have a styrene/rubber ratio between approximately 0.1 and 0.8 and a molecular weight, as indicated by viscosity in toluene at 25° C., of from about 100 to 2000 cps in a 15 to 25% b.w. rubber solution. Exemplary block rubbers are (a) a styrene-ethylene-propylene block copolymer (SEP), unplasticized, having a styrene/rubber ratio of about 0.59, a specific gravity of about 0.93, a breaking strength per ASTM D-412 of 300 psi, and being available from the Shell Chemical Company of Houston, Tex., under the trade designation Kraton G1701; (b) styrene-ethylene-butylene block copolymer (SEB), having a styrene/rubber ratio about 0.41, and being available from the Shell Chemical Company under the designation TRW-7-1511; (c) styrene-ethylene-butylene-styrene block copolymer (SEBS), unplasticized, and having a styrene/rubber ratio of about 0.41, a specific gravity of about 0.91, 500% elongation, 300% modulus per ASTM D-412 of 700 psi, and being available from the Shell Chemical Corporation under the trade designation Kraton G1652. Other styrene-rubber or styrene-rubber-styrene block copolymers are styrene-isoprene rubber (SI) and styrene-isoprene-styrene (SIS) rubber, styrene-butadiene (SB) and styrene-butadien-styrene (SBS) rubber. An example of SIS is Kraton D1107, and an example of SBS is Kraton D1102, both available from the Shell Chemical Company.

Among the semiliquid rubbers found useful are high viscosity polyisobutylenes having a Flory molecular weight between about 20,000 and 70,000. Exemplary thereof is a polyisobutylene having a Flory molecular weight of about 42,600–46,100, a specific gravity of about 0.91, and a Brookfield viscosity at 350° F. (about 177° C.) of about 26,000–35,000 cps, and available from the Exxon Chemical Company of Houston, Tex., under the trade designation Vistanex LM-MS. Other rubbers which are considered to be useful are butyl rubber, ethylene-propylene rubber (EPR), ethylene-propylene dimer rubber (EPDM), and chlorinated butyl rubber having a Mooney viscosity ML 1+8 at 100° C. per ASTM D-1646 of between about 20 and 90. Examples of the above are Butyl 077, Vistalon 404, Vistalon 3708, and Chlorobutyl 1066, respectively, all available from the Exxon Chemical Company. Also useful are depolymerized rubbers having a viscosity of between about 40,000 and 400,000 cps at 38° C. An example thereof is DPR 75 available from Hardman, Inc. of Belleville, N.J.

Oil-retention has been tested by using a procedure that substantially corresponds to the Rural Electrification Authority (REA) PE-89 oil-retention test. If any measured amount of dripped oil is present from this test, the grease composition may be considered to have failed the oil-retention test. Another test comprises centrifuging a 30 gm sample of a composition for 60 minutes at 10,000 rpm, and decanting and weighing any separated oil at the end of the test period. It has been determined that in order for the composition to have desirable oil retention up to about 60° C. or about 80° C., it should exhibit at room temperature oil separation not greater than about 7% and about 2.5%, respectively, as determined by the above centrifuge test.

The composition of the waterblocking material 56 is intended to block effectively entry of water into the core 52 while minimizing the added loss to the cable in order to provide excellent optical performance. Although the oil retention characteristic of the composition is a concern, the most important property is the optical performance of the cable 50.

Table I shows the effect of several different bleed inhibitors on oil separation, for two different oils, Drakeol 35 and L-100. The three block copolymer-containing compositions comprise 92% b.w. oil, 6% b.w. Cab-O-Sil N70-TS colloidal filler, and 2% b.w. inhibitor. The semiliquid rubber-containing compositions LM-MS comprise 6% b.w. N70-TS colloidal filler, the indicated amounts of the inhibitor, and 89 and 84% b.w. of Drakeol 35.

Table I

| | Oil Separation | |
|---|---|---|
| Inhibitor | Drakeol-35 % Separation | L-100 % Separation |
| 2% SEP | 2.5 | 0.7 |
| 2% SEB | 11 | 3.5 |
| 2% SEBS | 5 | 2 |
| 5% LM-MS | 7 | — |
| 10% LM-MS | 2 | — |

Table II shows data on oil separation for several compositions that do not include bleed inhibitors. It should be evident that the addition of a bleed inhibitor is more effective than increasing the colloidal particle content of the composition in preventing oil separation or drip. Also, increasing the colloidal particle-content of a grease to the point where syneresis is avoided results in increased critical yield stress. Thus to avoid syneresis altogether, the low values of critical yield stresses needed in some instances may be unobtainable without use of bleed inhibitors. The data of Table II was obtained with N70-TS colloidal filler and Drakeol 35 oil.

Table II

| | Oil Separation | | | |
|---|---|---|---|---|
| fumed silica (% b.w.) | 6 | 7 | 8 | 10 |
| oil separation (% b.w) | 36 | 28 | 20 | 14 |

Figure 6:
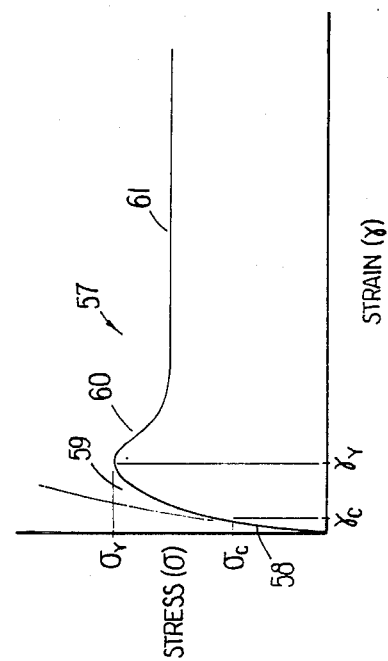
FIG. 6 is an exemplary curve of applied stress versus strain for a waterblocking material of the cable of FIGS. 4 and 5.

FIG. 6 shows a generalized stress-strain curve 57 at constant strain rate for a thixotropic material such as that used as the waterblocking material 56, and identifies several important parameters. In segment 58 of the stress-strain curve 57, the material acts essentially an an elastic solid. The segment 58 extends from zero stress to the critical yield stress $\sigma_c$. The strain corresponding to $\sigma_c$ is identified as $\gamma_c$, the critical shear strain. By definition, the coordinates $\sigma_c$, $\gamma_c$ indicate the onset of yielding and the quantity $\sigma_c/\gamma_c$ (or $\delta\sigma/\delta\gamma$ for $\sigma < \sigma_c$) is known as the shear modulus ($G_e$) of the material.

The prior art teaches that filling materials for optical fiber cable need to have low values of $G_e$. However, it has been determined that, at least for some applications, a low value of $G_e$ of the filling material is not sufficient to assure low cabling loss, and that a further parameter, the critical yield stress $\sigma_c$, also needs to be controlled. Typically, the critical yield stress of material according to the invention is not greater than about 70 Pa, measured at 20° C. whereas the shear modulus is less than about 13 kPa at 20° C.

A segment 59 of the stress-strain curve of FIG. 6 represents increasing values of the incremental strain for increasing stress. The stress $\sigma_y$ is the maximum value of stress sustainable by the material at a given strain rate with $\gamma_y$ being the corresponding strain. For strains in excess of $\gamma_y$, the stress at first decreases as shown by segment 60, becoming substantially independent of strain for still greater values of strain as shown by the segment 61. The waterblocking material thus exhibits a liquid like behavior for $\gamma > \gamma_y$.

The mechanical properties of the inventive composition are a function of the colloidal particle content. For example, it has been determined that $\sigma_c$ as well as $G_e$ decreases with decreasing particulate content.

A filling composition for a filled cable 50 typically comprises between about 77 and about 95% b.w. oil. If a bleed inhibitor is present and the inhibitor is a rubber block copolymer, then the oil content typically is between about 90 and about 95% b.w. On the other hand, if the bleed inhibitor is a semiliquid rubber, then the oil content typically is between about 77 and about 91% b.w. The composition further comprises at most 15% b.w., preferably at most 10% b.w., of colloidal particles. If the colloidal particles are fumed silica, then a typical range is from 2 to about 10% b.w., with 5–8% b.w. being currently preferred for some applications. The bleed inhibitor content of the composition is typically between about 0.5 and 15%, with the currently preferred range for block copolymer rubbers being between about 0.5 and about 5% b.w., and for semiliquid rubbers being between about 3 and about 15% b.w. Optionally, the composition may also comprise minor amounts of an oxidative stabilizer and other additives. An exemplary stabilizer is tetrakis methane, available from Ciba-Geigy under the trade designation Irganox 1010. Typically the oil, colloidal particles, and, if used, a bleed inhibitor, account for about 99% b.w. or more of the total composition.

Exemplary compositions that were studied are shown in Table III in parts by weight. The compositions were prepared by known methods, typically comprising blending oil, bleed inhibitor, antioxidant, and colloidal particle material first at ambient temperature and pressure, then at ambient temperature under a partial vacuum (typically less than about 300 Torr). Some compositions, e.g. E, were heated to about 150° C. while being stirred, and maintained at that temperature for about 4 hours. The resulting compositions were evaluated, including a determination of $\sigma_c$ and $G_e$ of some by cone-and-plate rheometry.

An exemplary summary of the properties also is presented in Table III with all measurements of $\sigma_c$ and $G_e$ being at 20° C. The stress values designated (a) were determined without aging while those designated (b) were aged for the time indicated. Of the example compositions disclosed in Table III, example A is preferred.

TABLE III

| Examples Constituents | COMPOSITIONS (parts b.w.) | | | | | | | | | | | | |
|---|---|---|---|---|---|---|---|---|---|---|---|---|---|
| | A | B | C | D | E | F | G | H | I | J | K | L | M |
| Oil (Drakeol 35) | 93 | 97.5 | 92.5 | 92 | 92 | 95.5 | | | 92 | 92 | 88 | 83 | 91.5 |
| Oil (L-100) | | | | | | | 93 | 92 | | | | | |
| Colloidal Filler (N70-TS) | 7.0 | | 6.0 | 6.5 | 6.0 | | 7.0 | 6.0 | 6.0 | 6.0 | 7.0 | 7.0 | 7.0 |
| Colloidal Filler (M5) | | 2.5 | | | | 2.5 | | | | | | | |
| Bleed Inhibitor (Kraton G1701) | | | 1.5 | 1.5 | 2.0 | 2.0 | | 2.0 | | | | | 1.5 |
| Bleed Inhibitor (Kraton G1657) | | | | | | | | | 2.0 | | | | |
| Bleed Inhibitor (TRW-7-1511) | | | | | | | | | | 2.0 | | | |
| Bleed Inhibitor (LM-MS) | | | | | | | | | | | 5.0 | 10 | |
| Stabilizer (Irganox | 0.2 | 0.2 | 0.2 | 0.2 | 0.2 | 0.2 | 0.2 | 0.2 | 0.2 | 0.2 | 0.2 | 0.2 | 0.2 |

TABLE III-continued

| Examples Constituents | COMPOSITIONS (parts b.w.) | | | | | | | | | | | | |
|---|---|---|---|---|---|---|---|---|---|---|---|---|---|
| | A | B | C | D | E | F | G | H | I | J | K | L | M |
| 1010) | | | | | | | | | | | | | |
| (a)$\sigma_c$(Pa) | 10 | 9.4 | 7.2 | 8.1 | 6.6 | | 8.1 | | | | | 3.6 | 15 |
| (a)$G_e$(kPa) | 1.8 | .5 | 1.5 | 1.7 | 1.7 | | 1.7 | | | | | 2.0 | 2.6 |
| time(hrs) | 16 | | 16 | 16 | 16 | | 16 | | | | | 16 | 22 |
| (b)$\sigma_c$(Pa) | 10 | | 13 | 14 | 15 | | 17 | | | | | 6.9 | 27 |
| (b)$G_e$(kPa) | 1.8 | | 1.8 | 2.0 | 1.8 | | 2.2 | | | | | 1.8 | 3.0 |

Advantageously, the waterblocking material 56 which is used to fill the core of a cable of this invention yields at a low enough stress so that the optical fibers 24—24 and units 22—22 are capable of moving within the core when the cable is loaded or bent. The yielding filling material allows the optical fiber to move within the tube 54 which reduces the stress therein and lengthens the life of the optical fibers.

As mentioned hereinbefore, the cable of this invention may be made with the units not being stranded together, as in the preferred embodiment, or stranded or with an oscillating lay. Of course, the non-stranded is preferred inasmuch as the stranding apparatus may be eliminated and line speeds increased.

The tube 54 may be considered as one element of a sheath system of the cable 50. Returning now to FIGS. 4 and 5, it is seen that over the tube 54 are disposed other elements of a sheath system comprising a tape 63, a metallic shield 65 which is corrugated, and which has an overlapped longitudinal seam, and reinforcing strength members 70—70. A jacket 72 of polyethylene, for example, encloses the strength members 70—70. As in the cable of FIGS. 1 and 2, the strength members are steel wires in the preferred embodiment. However, it is apparent that other materials, metallic and non-metallic, may be used for those members.

The metallic shield 65 may be a variety of metallic materials such as steel, stainless steel, bronze, copper-steel bimetal, aluminum or others. In the preferred embodiment, the metallic shield 65 has each of its sides coated with a material such as an acrylic acid copolymer material. Such a material serves two functions. It seals the metallic material against corrosion and it causes the shield to become bonded to the plastic jacket 72. Typically, each coating layer has a thickness of about 0.003 inch.

It should be observed that in a preferred embodiment of the cable of FIGS. 4 and 5, one of the strength members 70—70 is disposed adjacent to the overlapped seam of the metallic shield 65. This arrangement facilitates removal of the sheath system by identifying the location of the seam.

Figures 7, 8:
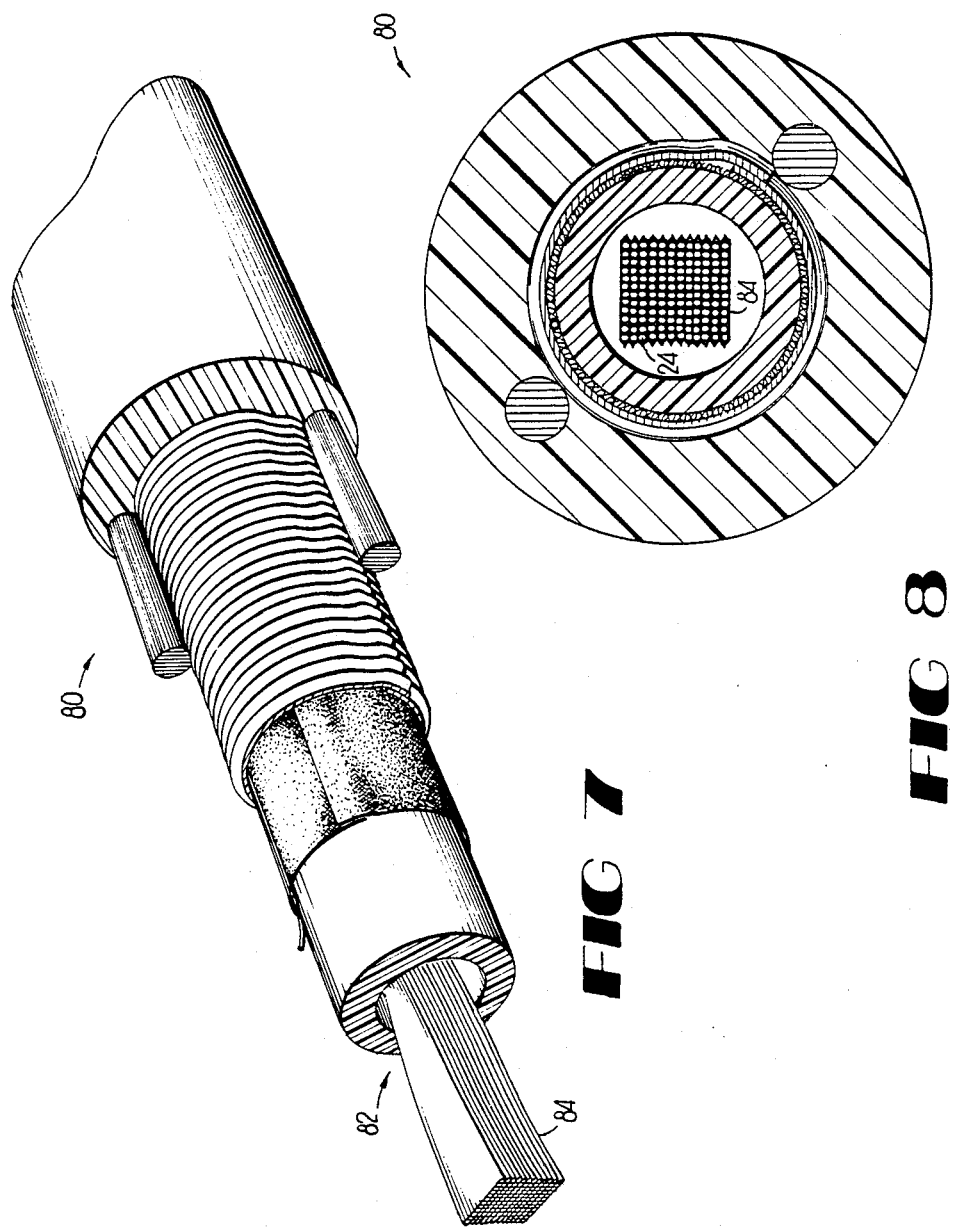
FIG. 7 is a perspective view of an optical fiber cable of this invention having a ribbon core.
FIG. 8 is an end view of the optical fiber cable of FIG. 7.

In FIGS. 7 and 8, there is shown a cable 80 which includes the same sheath components as does the cable of FIGS. 4 and 5. Accordingly, these components are designated with the same numerals as in FIGS. 4 and 5. The cable 80 includes a core 82 which includes a stack of optical fiber ribbons 84—84. Each of the ribbons 84—84 includes a plurality of optical fibers 24—24. Although the cable core 82 which is depicted in FIGS. 7 and 8 is not filled with a waterblocking material such as that designated 56 in FIGS. 4 and 5, it should be understood that it could be so filled.

Figures 9, 10:
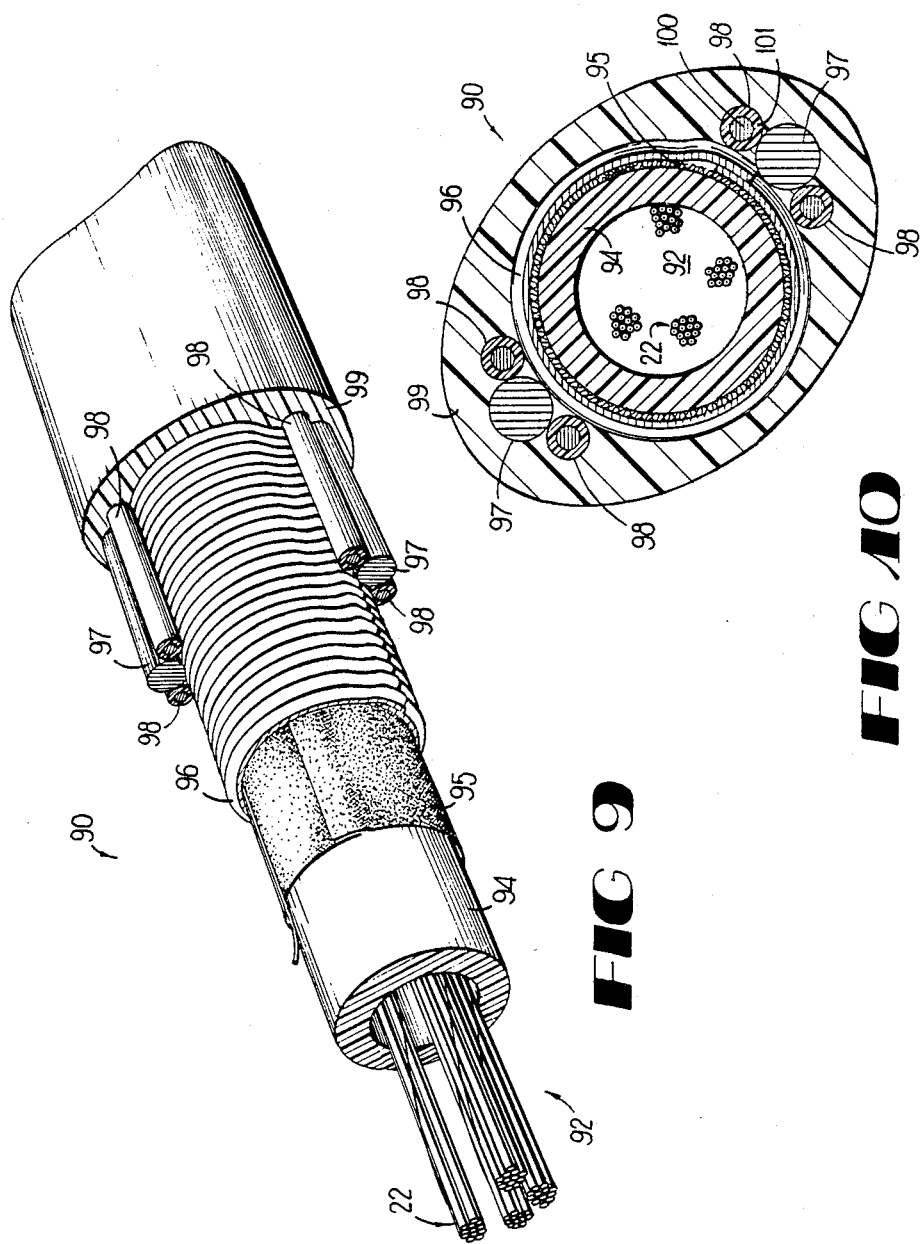
FIG. 9 is a perspective view of a cable of this invention in which the transverse cross section is non-circular.
FIG. 10 is an end cross sectional view of the cable of FIG. 9.

Another embodiment of the cable of this invention is shown in FIGS. 9 and 10. In that embodiment, which is designated generally with the numeral 90, a core 92 which includes optical fiber units 22—22 or ribbons (not shown) is enclosed in a tubular member 94. The tubular member 94 is enclosed in a water absorbing tape 95 and a corrugated metallic shield 96. Two diametrically opposed linearly extending steel strength members 97—97 are disposed adjacent to the shield 96. Further, two insulated metallic conductors 98—98, each of which includes a metallic conductive portion 100 and an insulative cover 101, are associated with each strength member and extend colinearly therewith. It is to be understood that such conductors 98—98 may be included in any of the embodiments of this invention. A plastic jacket 99, such as one which is made of polyethylene, encloses the strength members and has a controlled coupling thereto and encloses the shield. However, the jacket 99 in this embodiment, unlike the one in FIG. 4, has a non-circular, generally oval cross sectional configuration.

Figure 12:
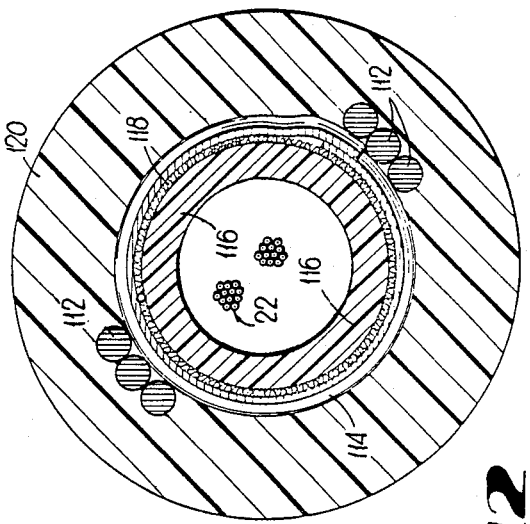
FIG. 12 is an end view in section of the cable of FIG. 11.
Figure 11:
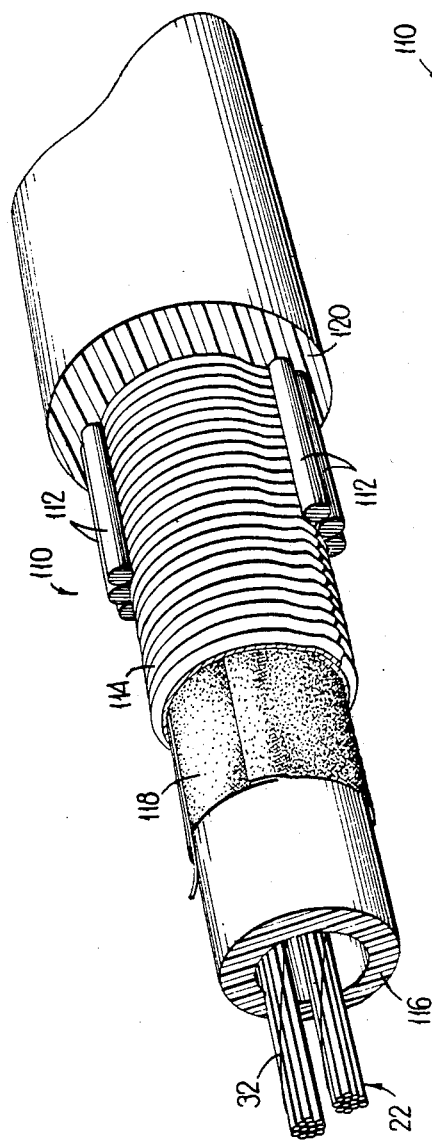
FIG. 11 is a perspective view of still another embodiment of the cable of this invention.

Still another embodiment of the inventive cable is shown in FIGS. 11 and 12 and is designated by the numeral 110. Therein, it is seen that instead of two diametrically opposed strength members, the cable includes three strength members 112—112 grouped at each end of a diametral plane and adjacent to a corrugated metallic shield 114 which encloses a tubular member 116 and a water absorbing tape 118. Each group of three strength members are arranged circumferentially of the core. The group of strength members which are coupled controllably to a plastic jacket 120 need not be limited to three. In such an arrangement, the neutral axis of bending extends through the center of each group of strength members. This results from the reorientation of the cable when subjected to bending.

It is to be understood that the above-described arrangements are simply illustrative of the invention. Other arrangements may be devised by those skilled in the art which will embody the principles of the invention and fall within the spirit and scope thereof.

What is claimed is:

1. An optical fiber cable, which comprises:
   a core comprising at least one optical fiber;
   a tubular member which encloses said core;
   a jacket which is made of a plastic material and which encloses said tubular member; and
   a strength member system which is held adjacent to said tubular member by said jacket and which is substantially embedded in said jacket, said strength member system comprising two diametrically opposed linear members extending parallel to a longitudinal axis of the cable and being coupled to said jacket without necessarily being coupled to said tubular member, the strength members being positioned and having relative tensile and compressive stiffnesses which are predetermined to control the location of the neutral axis of the cable in bending, with the compressive stiffness of the strength members and the coupling thereof to the jacket being sufficient to provide a composite which is effective to inhibit substantially contraction of said cable.

2. The optical fiber cable of claim 1, wherein the tensile and compressive stiffnesses are such that the neutral axis of the cable in bending is caused to extend through said strength members.

3. The optical fiber cable of claim 1, wherein said tensile and compressive stiffnesses of said strength members are substantially equal.

4. The optical fiber cable of claim 1, wherein each of the optical fibers is provided with a coating and wherein the ratio of the plurality of coated optical fibers to the cross-sectional area within the tubular member does not exceed a predetermined value.

5. An optical fiber cable, which comprises:
a core comprising at least one optical fiber;
a tubular member which encloses said core, wherein each of the optical fibers is provided with a coating and wherein the ratio of the plurality of coated optical fibers to the cross-sectional area within the tubular member does not exceed a predetermined value of about 0.5.
a jacket which is made of a plastic material and which encloses said tubular member; and
a strength member system which is disposed adjacent to said tubular member and which comprises two diametrically opposed linear members extending parallel to a longitudinal axis of the cable and being coupled to said jacket, the strength members having relative tensile and compressive stiffnesses which are predetermined to control the location of the neutral axis of the cable in bending, with the compressive stiffness of the strength members and the coupling thereof to the jacket being sufficient to provide a composite which is effective to inhibit substantially contraction of said cable.

6. The optical fiber cable of claim 1, wherein each of said strength members comprises a single strand which is made of a steel material.

7. The optical fiber cable of claim 6, wherein each of said strength members has a tensile modulus and a compressive modulus each being about 30,000 psi.

8. The optical fiber cable of claim 1, which also includes a tape which is made of a water absorbent material and which is interposed between said tubular member and said jacket.

9. The optical fiber cable of claim 8, wherein said strength members are in engagement with said tape.

10. The optical fiber cable of claim 1, which also comprises a corrugated metallic shield which is disposed about said core, said shield having a longitudinal overlapped seam.

11. The optical fiber cable of claim 10, where each of said strength members is in engagement with an outer surface of said shield., 12. The optical fiber of claim 11, which also includes a tape which is made of a water absorbent material and which is interposed between said tubular member and said shield.

13. The optical fiber cable of claim 1 wherein said core is provided with a waterblocking material and the waterblocking material has a critical yield stress which is not greater than about 70Pa at 20° C. and a shear modulus less than about 13kPa at 20° C.

14. The cable of claim 14, wherein said waterblocking material is a composition of matter which comprises:
(a) 77 to 95% by weight of an oil selected from the group consisting of i. paraffinic oil having a minimum specific gravity of about 0.86 and a pour point less than $-4°$ C. and being of ASTM type 103, 104A or 104B;
ii. naphthenic oil having a minimum specific gravity of about 0.86 and a pour point less than $-4°$ C. and being of ASTM type 103,104A or 104B; and
iii. polybutene oil having a minimum specific gravity of about 0.83 and a pour point less than 18° C.; and
iv. any mixture thereof; and
(b) 2 to 15% by weight of hydrophobic fumed silica colloidal particles.

15. The cable of claim 14, wherein said composition of matter also includes about 6 to 8.5% by weight colloidal particles selected from the group consisting of hydrophobic fumed silica, hydrophillic fumed silica, precipitated silica and clay, the colloidal particles having a BET surface area in the range from about 50 to about 400m$^2$/G.

16. The cable of claim 14, wherein said waterblocking material is a composition of matter which comprises:
(a) about 77 to 95% by weight of an oil selected from the group consisting of:
i. paraffinic oil having a minimum specific gravity of about 0.86 and a pour point of less than $-4°$ C. and being of ASTM type 103,104A or 104B;
ii. naphthenic oil having a minimum specific gravity of about 0.86 and a pour point less than $-4°$ C. and being of ASTM type 103, 104A or 104B;
iii. polybutene oil having a minimum specific gravity of about 0.83 and a pour point of less than 18° C.;
iv. triglyceride-based vegetable oil;
v. polypropylene oil;
vi. chlorinated parrafin oil having a chlorine content between about 30 and 75% by weight and a viscosity at 25° C. of between 100 and 10,000 cps;
vii. polymerized esters, and
viii. any mixture thereof; and
(b) about 2 to 15% weight colloidal particles selected from the group consisting of hydrophobic fumed silica, hydrophilic fumed silica, precipitated silica, and clay, the colloidal particles having a BET surface area in the range from about 50 to about 400$^2$/g.

17. The cable of claim 16, which also includes not more than about 15% by weight of a bleed inhibitor selected from the group consisting of styrene-rubber-styrene block copolymers having a styrene/rubber ratio between about 0.1 and about 0.8, semiliquid rubber having a Flory molecular weight between 20,000 and 70,000, butyl rubber, ethylene-propylene rubber, ethylene-propylene dimer rubber, ethylene-propylene rubber, ethylene-propylene dimer rubber, chlorinated butyl rubber having a Mooney viscosity at 100° C. between about 20 and 90, and depolymerized rubber having a viscosity at 38° C. between about 40,000 and 400,000cps, with the oil, the colloidal particles, and the bleed inhibitor comprising at least 99% by weight of the composition of matter.

18. The cable of claim 17, wherein said composition comprises about 90 to 95% b.w. of oil and about 2 to 10% b.w. of colloidal particles.

19. The optical fiber cable of claim 1, wherein at least one insulated metallic conductor is associated with each of said strength members and extends adjacent thereto and colinearly therewith.

20. The optical fiber cable of claim 1, wherein said jacket has a generally oval cross section with each strength member being disposed in one of the portions having a minor radius of curvature.

21. The optical fiber cable of claim 5, which also includes a tape which is interposed between said tubular member and said jacket and wherein said tape comprises a spun bonded polyester material.

* * * * *